(12) United States Patent
Vitale et al.

(10) Patent No.: US 9,663,012 B2
(45) Date of Patent: May 30, 2017

(54) MANAGING DUMP BODY CONTROLS ON AUTOMONOUS MACHINES

(71) Applicant: Caterpillar Inc., Peoria, IL (US)

(72) Inventors: Andrew Vitale, Edwards, IL (US); Jeffery McCullough, Springfield, IL (US); Thomas Brooks, Oakley, IL (US); Michael Hudson, Mt. Zion, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/658,535

(22) Filed: Mar. 16, 2015

(65) Prior Publication Data
US 2016/0272101 A1   Sep. 22, 2016

(51) Int. Cl.
*B60P 1/16* (2006.01)
*B60P 1/04* (2006.01)
*B60P 1/28* (2006.01)
*G05D 1/00* (2006.01)

(52) U.S. Cl.
CPC ............. *B60P 1/16* (2013.01); *B60P 1/045* (2013.01); *B60P 1/28* (2013.01); *G05D 1/0088* (2013.01)

(58) Field of Classification Search
CPC   B60P 1/04; B60P 1/16; G05D 1/0088; G05D 1/02; G05D 1/021
See application file for complete search history.

(56) References Cited

U.S. PATENT DOCUMENTS

| | | | |
|---|---|---|---|
| 3,464,755 A | 9/1969 | Brown | |
| 4,202,175 A | 5/1980 | Hale et al. | |
| 4,553,734 A | 11/1985 | Oka et al. | |
| 4,981,186 A * | 1/1991 | Shankle | G01G 19/10 177/1 |
| 5,192,189 A | 3/1993 | Murata et al. | |
| 5,416,706 A * | 5/1995 | Hagenbuch | G08G 1/20 177/136 |
| 5,913,180 A * | 6/1999 | Ryan | B67D 7/145 235/375 |
| 5,941,921 A * | 8/1999 | Dasys | E02F 3/434 414/699 |
| 6,175,788 B1 * | 1/2001 | Hasegawa | B60G 17/0185 701/33.9 |
| 9,000,954 B2 * | 4/2015 | Borland | G08G 1/207 340/436 |
| 9,242,589 B2 * | 1/2016 | Itai | B60P 1/283 |
| 2012/0143434 A1 | 6/2012 | Donnelli et al. | |
| 2013/0129460 A1 * | 5/2013 | Gabibulayev | F15B 11/044 414/699 |
| 2015/0112769 A1 * | 4/2015 | Collins | G06Q 10/0637 705/7.36 |

FOREIGN PATENT DOCUMENTS

SE   WO2013180622   * 12/2013

* cited by examiner

*Primary Examiner* — Adam Tissot
*Assistant Examiner* — Tamara Weber
(74) *Attorney, Agent, or Firm* — Bookoff McAndrews

(57) ABSTRACT

System and methods for managing operations of one or more machines are disclosed. One method includes receiving first information relating to an operation of a dump body of a hauling machine operating in at least a partially autonomous manner, determining a failure condition of the operation based at least on the received first information, transmitting a notification relating to the failure condition, and causing a boost pressure to be applied to the dump body of the hauling machine.

20 Claims, 5 Drawing Sheets

MANAGING DUMP BODY CONTROLS ON AUTOMONOUS MACHINES

TECHNICAL FIELD

This disclosure relates generally to an autonomous machine control system, and more particularly, to a system for autonomously controlling dumping actions of mobile machines.

BACKGROUND

Mobile machines, such as haul trucks and other types of heavy equipment, are often used to haul material from a load location at which the material is loaded into the machines, to a dump location at which the material is discharged from the machines. In order to maintain productivity and efficiency at a worksite while accomplishing predetermined site goals, travel of the machines at the dump location and positioning of the discharge material should be carefully managed. The need to properly manage the machines at the dump location can become even more important when the machines are working in high-wall operations and are autonomously controlled.

One attempt to control dump bed actuation is described in U.S. Pat. No. 4,553,734 to Oka ("the '734 patent). The '734 patent relates to a control system for the dump body of a dump vehicle including an electro-pneumatic dump control system which affords the finger pressure actuation of the dump body. However, such a control system does not contemplate autonomous operation of the dump body or autonomous management of an over-fill situation at a dump site which may result in the dump body not functioning properly.

These and other shortcomings of the prior art are addressed by the disclosure.

SUMMARY

System and methods for managing operations of one or more machines are disclosed. One method includes receiving first information relating to an operation of a dump body of a hauling machine operating in at least a partially autonomous manner, determining a failure condition of the operation based at least on the received first information, transmitting a notification relating to the failure condition, and causing a boost pressure to be applied to the dump body of the hauling machine.

In another aspect, a system may include a processor and a memory bearing instructions that, upon execution by the processor, cause the system at least to receive first information relating to an operation of a dump body of a hauling machine operating in at least a partially autonomous manner, determine a failure condition of the operation based at least on the received first information, transmit a notification relating to the failure condition, and cause a boost pressure to be applied to the dump body of the hauling machine.

In yet another aspect, a method may include receiving first information including an operational state of a machine, a machine type, and a worksite location of the machine, determining a failure condition of the operation based at least one the received first information, and generating a response signal based at least on the determined failure condition and the worksite location of the machine, wherein the response signal includes one or more of a notification of the failure condition

DETAILED DESCRIPTION

In accordance with aspects of the disclosure, systems and methods are provided to improve failure recovery for high wall dumping. As an example, one method of operating an autonomous machine such as a mining truck may include detecting whether a dump body of the machine is not lowering properly, informing a central station (e.g., offboard worksite controller) that an operational error has occurred, and/or increase down pressure to assist the dump body in lowering. As a further example, a hoist boost solenoid may be activated to manage the increased pressure for actuating the dump body.

Figure 1:
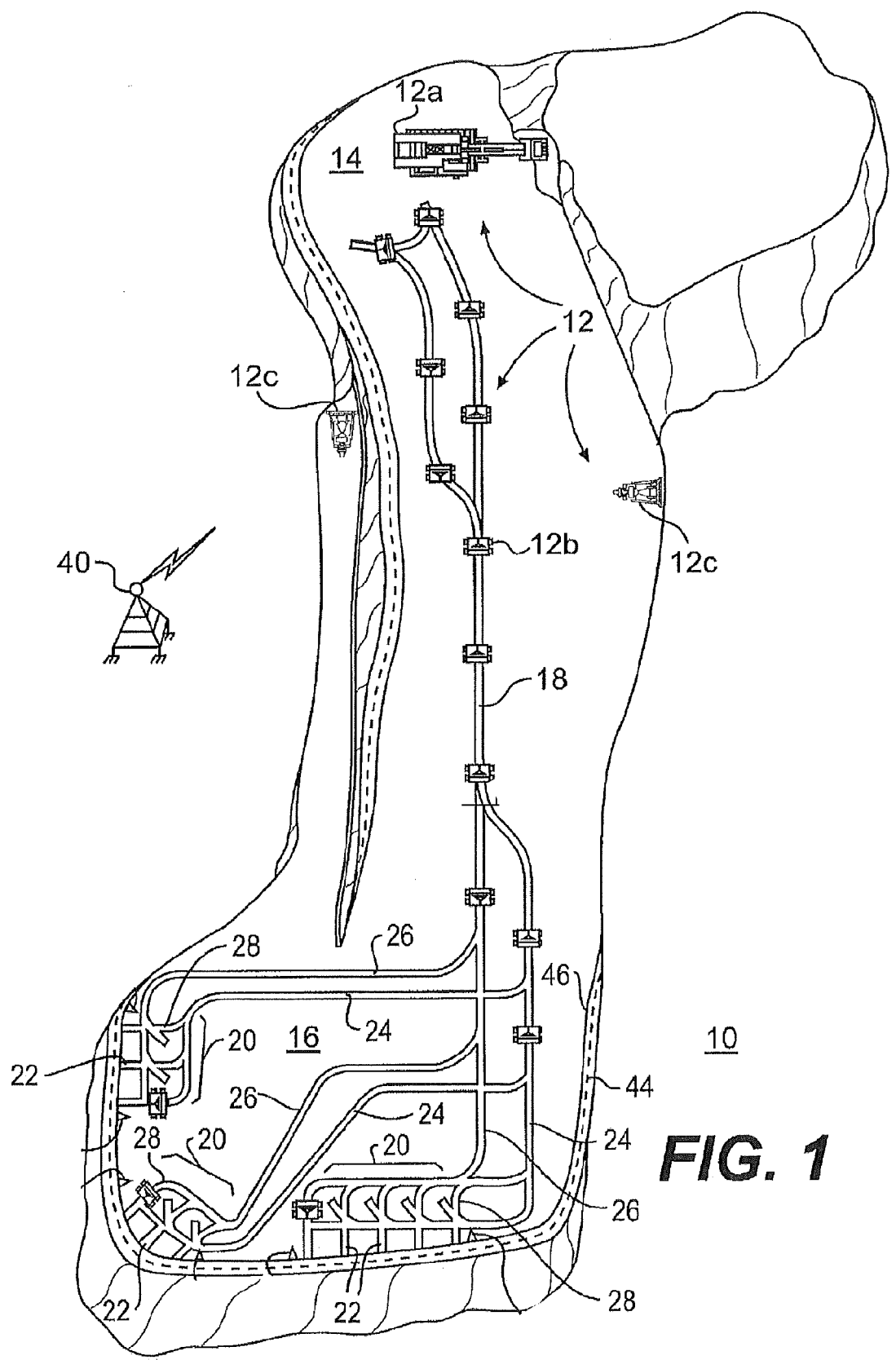
FIG. 1 is a diagrammatic illustration of an exemplary worksite in accordance with aspects of the disclosure.

FIG. 1 illustrates an exemplary worksite 10 having multiple, simultaneously-operable machines 12 performing a variety of predetermined tasks. The worksite 10 may include, for example, a mine site, a landfill, a quarry, a construction site, or any other type of worksite areas known in the art. The predetermined tasks may be associated with altering the current geography at the worksite 10 and include a clearing operation, a leveling operation, a hauling operation, a digging operation, a loading operation, a dumping operation, or any other type of operation that functions to alter the current geography at the worksite 10.

The worksite 10 may include multiple locations designated for particular purposes. For example, a first location 14 may be designated as a load location, at which a mobile loading machine 12a or other resource operates to fill multiple mobile hauling machines 12b with material. A second location 16 may be designated as a dump location, at which the hauling machines 12b may discharge their payloads. In an aspect, the dump location 16 may be positioned at an edge of a steep incline or cliff area known as a "high wall." In this aspect, the hauling machines 12b may be tasked with discharging their payloads over the edge or crest of the high wall. Accordingly, the worksite 10 may be a considered a "high-wall operation."

The hauling machines 12b may follow a main travel path 18 that generally extends between the load 14 and dump locations 16. One or more additional mobile dozing, grading, or other cleanup machines 12c at the worksite 10 may be tasked with clearing or leveling the load location 14, the dump location 16, and/or the main travel path 18 such that travel by the other machines 12 at these locations may be possible. As the machines 12 operate at the worksite 10, the shapes, dimensions, and general positions of the load location 14, the dump location 16, and the travel path 18 may change. The machines 12 may be self-directed machines configured to autonomously traverse the changing terrain of the worksite 10, manned machines configured to traverse the worksite 10 under the control of an operator, or hybrid machines configured to perform some functions autonomously and other functions under the control of an operator. In an aspect, at least some of the machines 12 at the worksite 10 are autonomously controlled.

The dump location 16 may be divided into groupings 20 of dump targets 22 at which the hauling machines 12b should discharge their loads. One or more of the groupings 20 may be assigned a dedicated entrance path 24 and a dedicated exit path 26 that connect at first ends with the main travel path 18, and the individual travel lanes 28 that extend between each of the dump targets 22 and opposing second ends of the corresponding entrance and exit paths 24, 26. It is contemplated that the dump location 16 may have any number of the groupings 20. By having multiple ones of the groupings 20 at the dump location 16, more than one of the hauling machines 12b may be operational at the dump location 16 at the same time without causing traffic problems and significant time delays along the entrance and exit paths 24, 26.

Figure 2:
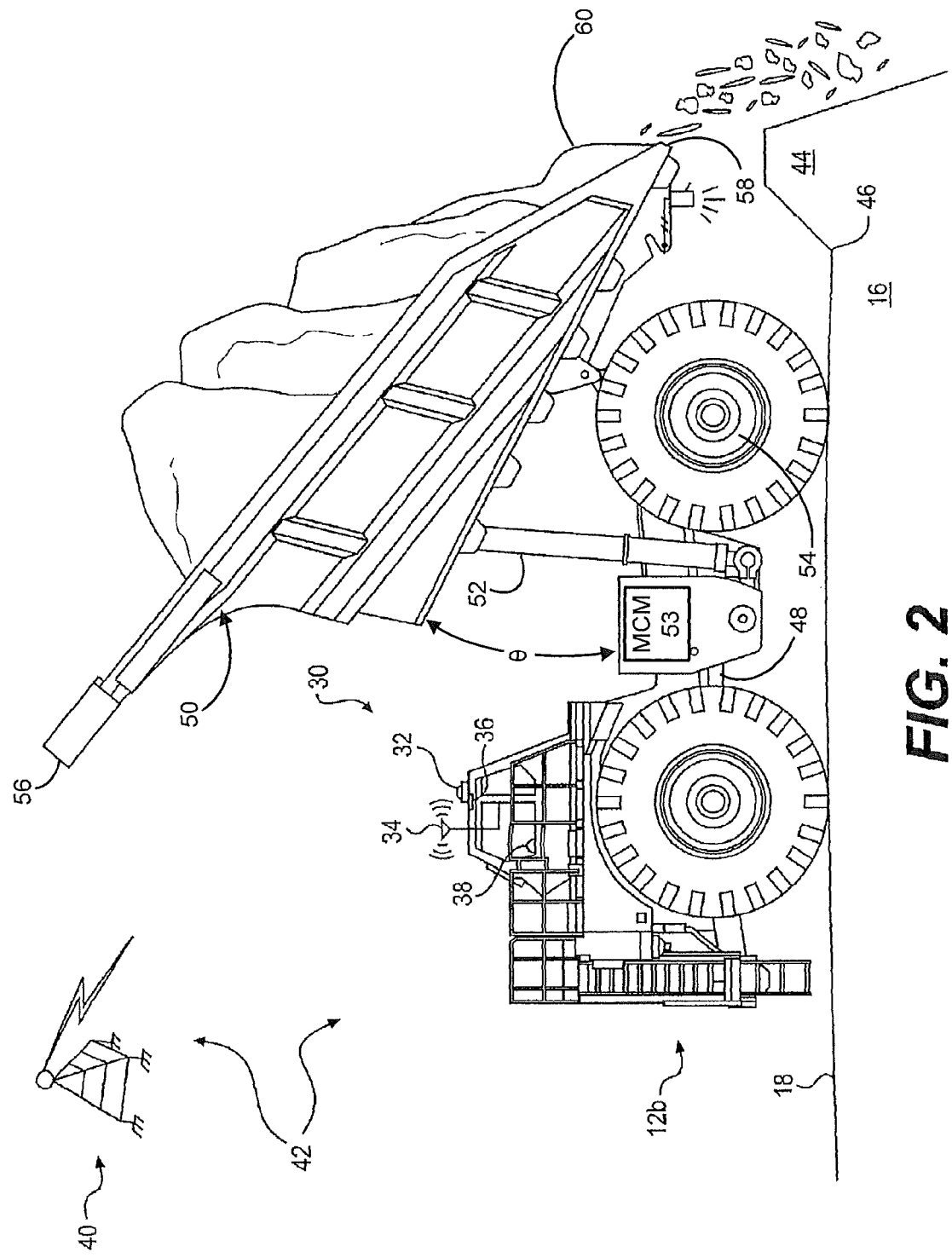
FIG. 2 is a diagrammatic illustration of a machine and control system in accordance with aspects of the disclosure shown at a normal dump site.

As shown in FIG. 2, one or more of the hauling machines 12b may be equipped with a control module 30 that facilitates or enhances autonomous and/or human control of the machine 12. Although the hauling machine 12b is illustrated, it is understood that any of the machines may be configured in the manner shown and described herein. In an aspect, the control module 30 may include, among other things, a locating device 32, a communicating device 34, and an onboard controller (OC) 36 connected to the locating device 32 and the communicating device 34. When intended for use with a manually operated one of the machines 12, the control module 30 may additionally include one or more operator interface devices 38. The operator interface devices 38 may include, for example, an input device such as a joystick, keyboard, steering wheel, pedal, lever, button, switch, etc. Alternatively or additionally, the operator interface devices 38 may include a display device, such as a monitor, if desired.

The locating device 32 may be configured to determine a position of the hauling machine 12b at the worksite 10 and generate a signal indicative thereof. The locating device 32 may embody, for example, a global navigation satellite system (GNSS) device, an Inertial Reference Unit (IRU), a local tracking system, or any other known locating device that receives or determines positional information associated with the hauling machine 12b. The locating device 32 may be configured to convey a signal indicative of the received or determined positional information to the OC 36 for processing. It is contemplated that the location signal may also be directed to one or more of the interface devices 38 (e.g., to the monitor) for display of machine location in an electronic representation of the worksite 10, if desired.

The communicating device 34 may include hardware and/or software that enables sending and receiving of data messages between the OC 36 and an offboard worksite controller (OWC) 40. The OWC 40, together with one or more of the control modules 30 of the hauling machines 12b, may embody a control system 42. The data messages associated with control system 42 may be sent and received via a direct data link, a wireless communication link, and/or a communication channel is defined herein, as desired. The direct data link may include an Ethernet connection, a connected area network (CAN), or another data link known in the art. The wireless communications may include satellite, cellular, infrared, and any other type of wireless communications that enable the communicating device 34 to exchange information between the OWC 40 and the components of the control module 30.

Based on information from the locating device 32 and/or instructions from the OWC 40, one or more of the OC 36 may be configured to help regulate movements and/or operations of its associated hauling machine 12b (e.g., direct movement of associated traction devices, brakes, work tools, and/or actuators; and operations of associated engines and/or transmissions). The OC 36 may be configured to autonomously control these movements and operations or, alternatively, provide instructions to a human operator of the hauling machine 12b regarding recommended control. The OC 36 may also be configured to send operational information associated with components of the hauling machine 12b offboard to the OWC 40, for example, via the communicating device 34, if desired. This information may include, for example, the coordinates of the hauling machine 12b, a traction device speed and/or orientation, tool and/or actuator positions, status information (e.g., temperatures, velocities, pressures, gear ratios, etc.), and other information known in the art.

The OC 36 may embody a single or multiple microprocessors, field programmable gate arrays (FPGAs), digital signal processors (DSPs), etc., that include a means for controlling operations of the hauling machine 12b in response to operator requests, built-in constraints, sensed operational parameters, and/or communicated instructions from the OWC 40. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezoelectric actuators), and communication circuitry.

The OWC 40 may include any means for monitoring, recording, storing, indexing, processing, and/or communicating various operational aspects of the worksite 10 and the hauling machine 12b. These means may include components such as, for example, a memory, one or more data storage devices, a central processing unit, or any other components that may be used to run an application. Furthermore, although aspects of the disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

The OWC 40 may be configured to execute instructions stored on computer readable medium to perform methods of travel path planning and control for the machines 12 at the worksite 10. That is, as described above, the operation of the machines 12 may cause changes to the geography of the worksite 10 and, in order for the machines 12, particularly those machines that are autonomously controlled, to adapt to the changing geography, travel path plans for the machines 12 should also change to keep up with the changes in terrain. The OWC 40 may execute the instructions to perform a method of planning that generates the travel paths 18, the groupings 20, the dump targets 22, the entrance paths 24, the exit paths 26, and other control aspects for the machines 12, and communicates this information to the different control modules 30 for individual implementation. As will be explained in more detail below, the OWC 40 may then manage movement of one or more of the hauling machines 12b (and/or the other machines 12) along the different travel paths to particular dump targets 22, and from dump targets 22 back to the load location 14 after discharge of material. Such management may be dependent on characteristics of the worksite 10 and/or the machines 12. As an example, various characteristics of the worksite 10 may include, among other things, a traversable area at the dump location 16, a contour of the dump location 16, and/or a composition of material to be discharged at the dump location 16. Various machine characteristics may include, among other things, a payload capacity of the hauling machines 12b, a size of the hauling machines 12b, a turning radius of the hauling machines 12b, and/or an output capacity (torque, tractive, etc.) of the hauling machines 12b.

In an aspect, the hauling machine 12b may be positioned adjacent a boundary berm 44 at the dump location 16. For example, the OWC 40 may process survey information including, among other things, a location of an inward edge 46 of the berm 44 also known as the berm toe, a width of the berm 44, a height of the berm 44, and/or a length of the berm 44 to aide in the control of the hauling machine 12b. As a further example, a survey may be generated automatically by a service vehicle (not shown), equipped with position tracking components, that travels along the edge 46 of the berm 44. It is contemplated, however, that the survey information may be generated in another manner, if desired. The survey information may be provided to the OWC 40 for further processing.

In an aspect, the hauling machine 12b may include a frame 48, a dump body 50, and at least one actuator 52 such as an extendable hoist cylinder in control communication with a control module (CM) 53 (e.g., machine control module (MCM), electronic control module (ECM), etc.), for example. The hauling machine 12b may include a single hydraulic cylinder, for example, a pair of extendable cylinders as is customary, or a plurality of cylinders to raise and/or lower the dump body 50. As an example, the motive force for lowering of the dump body 50 may be at least partial reliant on gravity. However, certain conditions may require additional down pressure to be applied via the actuator 52 and/or additional components.

In an aspect, the frame 48 of the hauling machine 12b may be mounted on one or more pairs of wheel assemblies 54 or other ground engaging assemblies. The frame 48 may be configured to support the pivotable dump body 50 and/or the actuator 52. As an example, the dump body 50 has a first end 56 and a second end 58. In an aspect, the first end 56 of the dump body 50 is the portion which is raised while dumping a payload 60. The second end 58 is the portion where the tipping of the dump body 50 occurs. As an example, the dump body 50 may be configured to carry the payload 60 and may be coupled to the actuator 52. The actuator 52 may be configured to tip the dump body 50 at a dump angle (θ) relative to a portion of the frame 48. As an example, the actuator 52 may be a hoist including a hydraulic cylinder or a hydro-pneumatic cylinder. As a further example, the control module (CM) 53 may be configured to control the activation of the actuator 52. In certain aspects, the CM 53 may be configured to activate a boost solenoid that is configured to increase a pressure in the actuator 52 to cause additional force to be applied to the dump body 50 for raising and/or lowering the dump body 50.

As an example, under normal raising operation of the dump body 50, a high pressure relief valve may control the max pressure of oil flowing to one or more cylinders (e.g. actuator 52), thereby managing a "raising force" via the cylinders. Boost pressure, such as controlled via a solenoid) is not required and may be un-actuated and blocked by an actuated dual stage signal spool (allowing only the high pressure relief to be supplied with oil). Similarly, a lower relief valve controls the max pressure of oil flowing to the cylinders, thereby managing a "lowering force" via the cylinders (e.g., actuator 52). Under normal conditions, the boost pressure is not required.

As another example, when there is insufficient force to lower the dump body 50 (e.g., due to excess material on tail at full high wall dump site), solenoid actuation may block the lower relief valve thereby controlling the pressure of oil flowing to cylinders (e.g., actuator 52) to exceed an intermediate pressure relief setting. Such increased pressure (e.g., boost pressure) thereby increases the lowering force over the force available at the lower relief setting (during a normal lower, described above). This boost pressure may be controlled by various means such as, for example, higher power down relief in hoist valve and a parallel pilot lower relief configured with a solenoid to block when raise/lower operation fails, a power down relief configured with a solenoid and restriction in a pressure tank, effectively raising pressure setting when actuated at raise/lower failure, larger body cable and higher power down relief in hoist valve, a high pressure relief in place of intermediate lower setting by adding a solenoid to pilot a selector, and other configurations.

In an aspect, the CM 53 may be configured to control the pressure applied to the dump body via one or more components, such as the actuator 52. As an example, the CM 53 may be in communication with a boost solenoid. As such, when the solenoid is activated the down force pressure of the actuator 52 is increased, allowing the dump body 50 to lower, even if the payload 60 is still sitting on the dump body 50. As a further example, parallel full flow lower relief valves with intermediate power down relief may include a solenoid. The solenoid may be activated to block the lower relief valves when an operation failure is detected, thereby increasing pressure to the actuator 52. A normal hoist down force pressure may be limited in order to prevent damage or breakage of the actuator 52 and retaining cables associated with the actuator 52. As such, in certain aspects, the use of the boost solenoid may be limited to certain conditions such as autonomous mode, emergency mode, or a service mode. As an example, the boost solenoid may be connected to a two wire driver so that it can be disabled in the event of a short to battery. As a further example, the CM 53 may be configured to detect open circuit, short to battery, and short to ground diagnostics on the driver and return side of the solenoid. As such, the solenoid may be disabled whenever a diagnostic is active against the solenoid. Other mechanisms for controlling boost pressures applied by the actuator 52 may be used.

INDUSTRIAL APPLICABILITY

The disclosed control system may be applicable to a multi-machine, high-wall operation where the machines are controlled to dump their loads past a berm and over the edge of a steep incline. Although applicable to any type of machine, the disclosed control system may be particularly applicable to autonomous or semi-autonomous machines where the machines are automatically controlled to follow particular routes to assigned dump targets. Furthermore, the dumping operation of the machines may be monitored and controlled to address failure conditions and to manage dump site over-fill conditions, for example.

Figure 3:
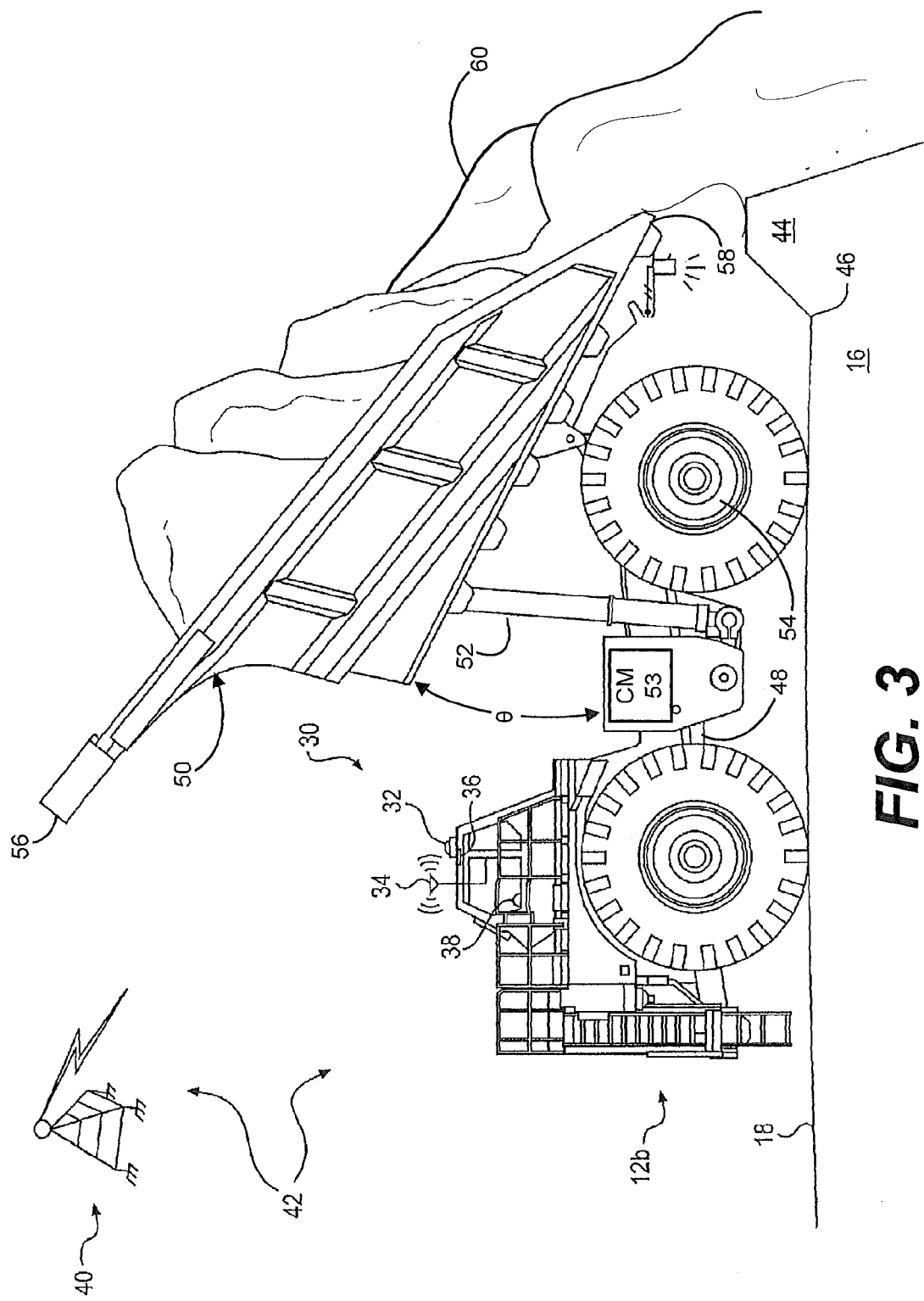
FIG. 3 is a diagrammatic illustration of a machine and control system in accordance with aspects of the disclosure shown at a full dump site.

As shown in FIG. 2, when the hauling machine 12b is positioned at the berm 44 of the dump location 16, the actuator 52 may be activated to cause the dump body 50 to raise and to cause the payload 60 to fall out of the dump body 50. However, in certain circumstances, as illustrated FIG. 3, the particular dump location 16 may be full of material. As such, when the actuator 52 is activated to cause the dump body 50 to raise, the payload 60 may not fully exit the dump body 50, since the dump location 16 is in an over-fill state. Conventionally, when this happens the dump body 50 may be stuck in a raised position because the load on the second end 58 of the dump body 50 will not allow the dump body 50 to lower as normal.

Figure 4:
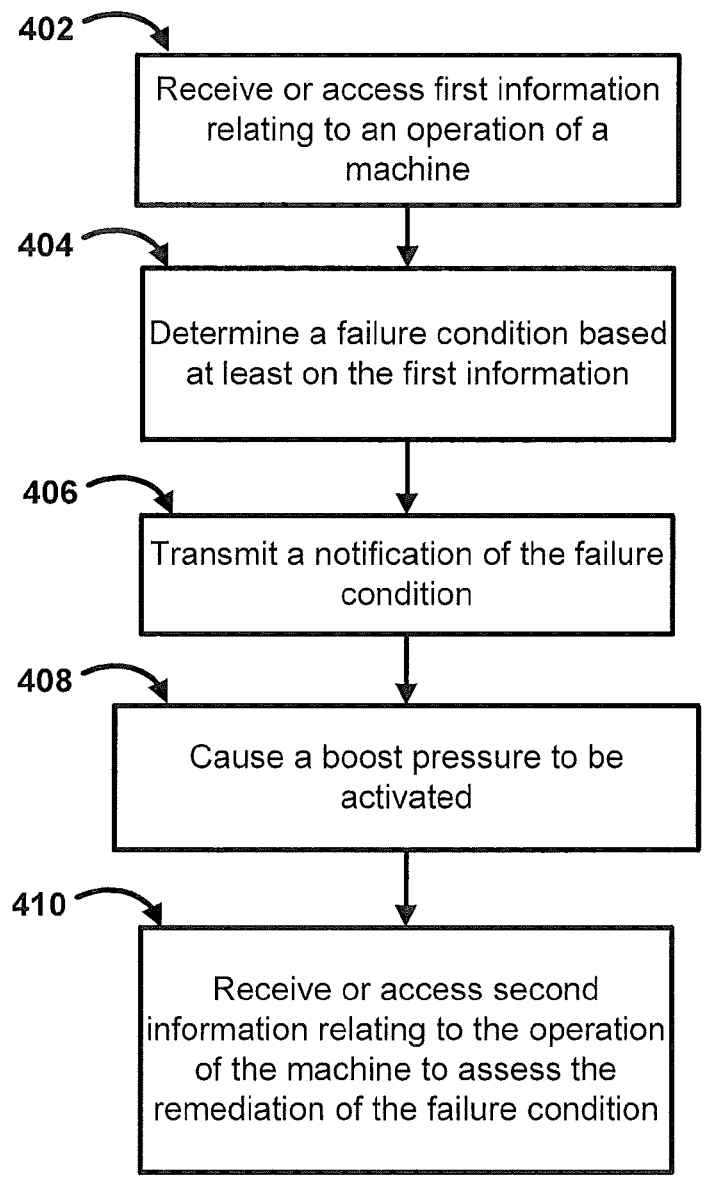
FIG. 4 is a flow chart of an exemplary method in accordance with aspects of the disclosure.

FIG. 4 provides an illustrative example of operating procedures that may be used to manage operations (e.g., dump operations) of one or more machines. For example, in reference to FIGS. 3 and 4, in step 402, first information relating to the operation of the machine may be accessed or received. The first information may be accessed or received by a computing device such as the CM 53, the control module 30, the OC 36, and/or the OWC 40. In an aspect, the first information may relate to the operation of the dump body 50 of the hauling machine 12b. As an example, the hauling machine 12b may be operating in at least a partially autonomous manner. The first information may include one or more of a lift position of the dump body and a pressure applied to the dump body by an actuator of the hauling machine. The first information may include an operational state of a machine, a machine type, and a worksite location of the machine, such as a dump location.

In step 404, a failure condition may be determined. In an aspect, the failure condition may relate to the operation of the machine such as an operation of the dump body 50 (e.g., raise or lower) of the hauling machine 12b. As an example, one or more of the CM 53, the control module 30, the OC 36, and the OWC 40 may be configured to process the received first information to make a determination of a failure condition. As another example, the determination of the failure condition may include one or more of comparing the first information to a threshold comparator and determining an irregularity in operation based on predetermined operational parameters. The threshold comparator may be a pre-determined lift angle θ of the dump body 50, a predetermined lift pressure applied by the actuator 52, or other comparative value. The determination of the irregularity may include analyzing the first information based upon historical data, modeled data, or a standard data for the operations of a particular machine. When the analysis identifies an outlier in the first information, it may be assumed that a failure has occurred. In certain aspects, the failure condition may include one or more of a failed raising of the dump body and a failed lowering of the dump body 50.

In step 406, a notification of the failure condition may be transmitted. In an aspect, the notification may be transmitted to a centralized worksite controller such as the OWC 40, for example. The notification may include an indication that the dump location 16 is full and remediation such as closing the dump site is required. In response to the notification, the OWC 40 or other recipient device may cause the machine to relocate to complete the failed operation. For example, the OWC 40 may autonomously cause the hauling machine 12b to relocate to a new dump location 16.

In step 408, a boost pressure may be activated. In an aspect, the boost pressure may be caused to be applied to the dump body 50 of the hauling machine 12b. As an example, causing the boost pressure to be applied to the dump body 50 may include increasing a lowering force applied to the dump body 50.

In step 410, second information relating to the operation of the machine may be accessed or received. In an aspect, the second information may include information relating to the operation of the dump body 50 of the hauling machine 12b in response to the applied boost pressure of step 408. Other information and feedback may be received or accessed to assess the remediation of the failure condition.

Those of skill will appreciate that the various illustrative logical blocks, modules, and algorithm steps described in connection with the aspects disclosed herein may be implemented as electronic hardware, computer software, or combinations of both. To clearly illustrate this interchangeability of hardware and software, various illustrative components, blocks, modules, and steps have been described above generally in terms of their functionality.

Whether such functionality is implemented as hardware or software depends upon the design constraints imposed on the overall system. Skilled persons may implement the described functionality in varying ways for each particular application, but such implementation decisions should not be interpreted as causing a departure from the scope of the disclosure. In addition, the grouping of functions within a module, block, or step is for ease of description. Specific functions or steps may be moved from one module or block without departing from the disclosure.

The various illustrative logical blocks and modules described in connection with the aspects disclosed herein may be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor (e.g., of a computer), or in a combination of the two. A software module may reside, for example, in RAM memory, flash memory, ROM memory, EPROM memory, EEPROM memory, registers, hard disk, a removable disk, a CD-ROM, or any other form of storage medium. An exemplary storage medium may be coupled to the processor such that the processor may read information from, and write information to, the storage medium. In the alternative, the storage medium may be integral to the processor. The processor and the storage medium may reside in an ASIC.

In at least some aspects, a processing system (e.g., the CM 53, the control module 30, the OC 36, and/or the OWC 40, etc.) that implements a portion or all of one or more of the technologies described herein may include a general-purpose computer system that includes or is configured to access one or more computer-accessible media.

Figure 5:
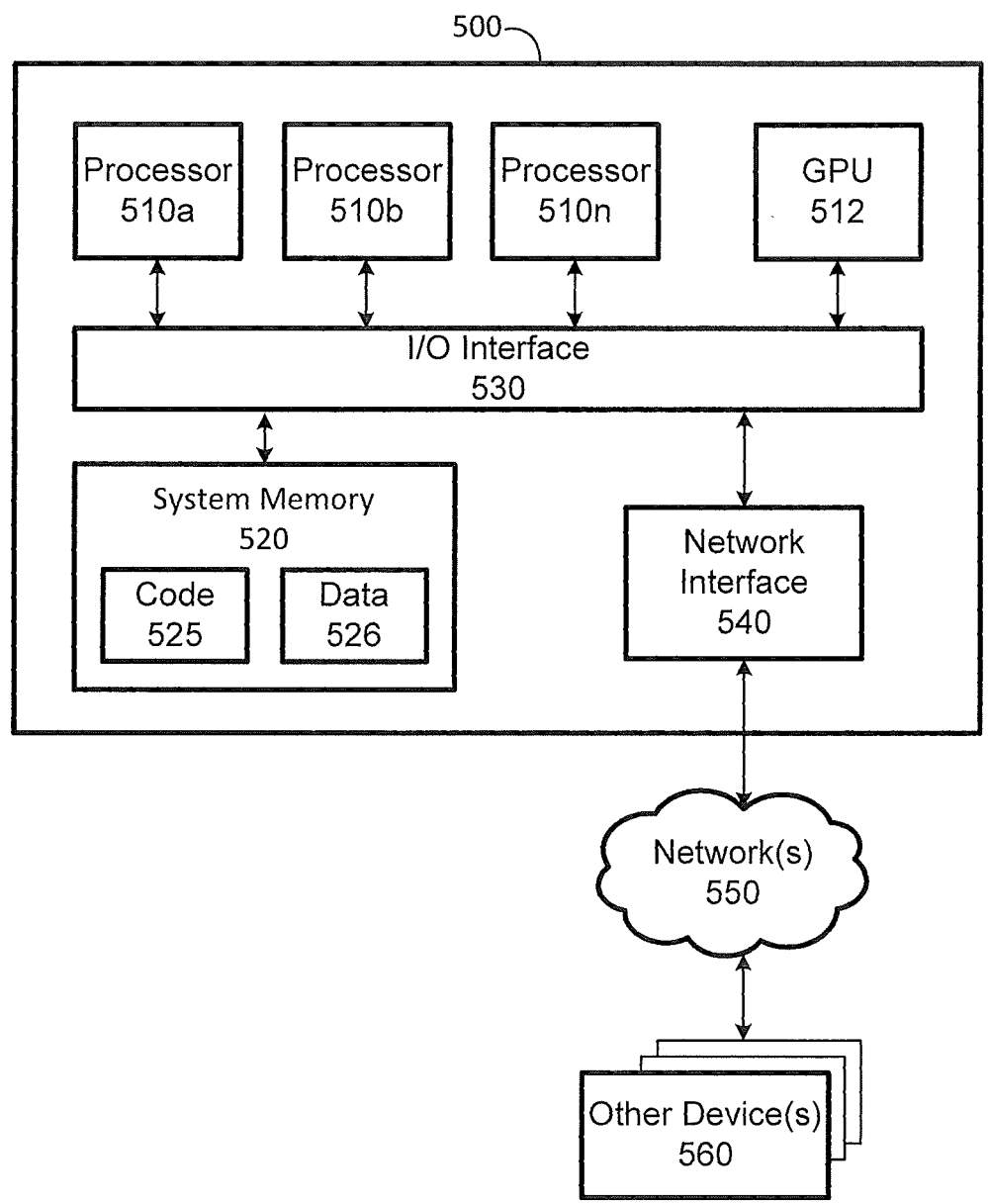
FIG. 5 is a block diagram of a computer system configured to implement the method of FIG. 4.

FIG. 5 depicts a general-purpose computer system that includes or is configured to access one or more computer-accessible media. In the illustrated aspect, the computing device 500 includes one or more processors 510a, 510b, and/or 510n (which may be referred herein singularly as a processor 510 or in the plural as the processors 510) coupled to a system memory 520 via an input/output (I/O) interface 530. The computing device 500 further includes a network interface 540 coupled to I/O interface 530.

In various aspects, the computing device 500 may be a uniprocessor system including one processor 510 or a multiprocessor system including several processors 510 (e.g., two, four, eight, or another suitable number). The processors 510 may be any suitable processors capable of executing instructions. For example, in various aspects, processor(s) 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA.

In some aspects, a graphics processing unit ("GPU") 512 may participate in providing graphics rendering and/or physics processing capabilities. A GPU may, for example, include a highly parallelized processor architecture specialized for graphical computations. In some aspects, processors 510 and GPU 512 may be implemented as one or more of the same type of device.

The system memory 520 may be configured to store instructions and data accessible by the processor(s) 510. In various aspects, the system memory 520 may be implemented using any suitable memory technology, such as static random access memory ("SRAM"), synchronous dynamic RAM ("SDRAM"), nonvolatile/Flash®-type memory, or any other type of memory. In the illustrated aspect, program instructions and data implementing one or more desired functions, such as those methods, techniques and data described above, are shown stored within the system memory 520 as code 525 and data 526.

In one aspect, the I/O interface 530 may be configured to coordinate I/O traffic between processor(s) 510, the system memory 520 and any peripherals in the device, including the network interface 540 or other peripheral interfaces. In some aspects, the I/O interface 530 may perform any necessary protocol, timing or other data transformations to convert data signals from one component (e.g., system memory 520) into a format suitable for use by another component (e.g., processor 510). In some aspects, the I/O interface 530 may include support for devices attached through various types of peripheral buses, such as a variant of the Peripheral Component Interconnect (PCI) bus standard or the Universal Serial Bus (USB) standard, for example. In some aspects, the function of I/O interface 530 may be split into two or more separate components, such as a north bridge and a south bridge, for example. Also, in some aspects some or all of the functionality of I/O interface 530, such as an interface to system memory 520, may be incorporated directly into processor 510.

The network interface 540 may be configured to allow data to be exchanged between the computing device 500 and other device or devices 560 attached to a network or networks 550, such as other computer systems or devices, for example. In various aspects, the network interface 540 may support communication via any suitable wired or wireless general data networks, such as types of Ethernet networks, for example. Additionally, network interface 540 may support communication via telecommunications/telephony networks, such as analog voice networks or digital fiber communications networks, via storage area networks, such as Fibre Channel SANs (storage area networks), or via any other suitable type of network and/or protocol.

In some aspects, the system memory 520 may be one aspect of a computer-accessible medium configured to store program instructions and data as described above for implementing aspects of the corresponding methods and apparatus. However, in other aspects, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 500 via I/O interface 530. A non-transitory computer-accessible storage medium may also include any volatile or non-volatile media, such as RAM (e.g., SDRAM, DDR SDRAM, RDRAM, SRAM, etc.), ROM, etc., that may be included in some aspects of the computing device 500 as system memory 520 or another type of memory. Further, a computer-accessible medium may include transmission media or signals, such as electrical, electromagnetic or digital signals, conveyed via a communication medium, such as a network and/or a wireless link, such as those that may be implemented via the network interface 540. Portions or all of multiple computing devices, such as those illustrated in FIG. 5, may be used to implement the described functionality in various aspects; for example, software components running on a variety of different devices and servers may collaborate to provide the functionality. In some aspects, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may include any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems, and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computer or computer processor. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed example aspects. The exemplary systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the disclosure may be practiced with other computer system configurations.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LTE), W-CDMA (Wideband Code-Division Multiple Access), Wireless Fidelity (Wi-Fi), Bluetooth, and/or the like, and/or a combination of two or more thereof.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

Conditional language used herein, such as, among others, "may," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain exemplary aspects have been described, these aspects have been presented by way of example only, and are not intended to limit the scope of the disclosure. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the disclosure. The accompanying claims and their equivalents are intended to cover such forms or modifications as would fall within the scope and spirit of certain aspects of the disclosure.

The preceding detailed description is merely exemplary in nature and is not intended to limit the disclosure or the application and uses thereof. The described aspects are not limited to use in conjunction with a particular type of machine. Hence, although the present disclosure, for convenience of explanation, depicts and describes particular machine, it will be appreciated that the track roller assembly and electronic control system in accordance with this disclosure may be implemented in various other configurations and may be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

We claim:

1. A method comprising:
   sensing first information relating to an operation of a dump body of a hauling machine, the hauling machine operating in at least a partially autonomous manner;
   receiving, by one or more processors, the first information, wherein the first information comprises an operational state of the hauling machine;
   determining, by the one or more processors, a failure condition of the operation based at least on the received first information;
   transmitting a notification relating to the failure condition from the one or more processors to a worksite controller, wherein the notification comprises an indication that a dump site is full; and
   causing a boost pressure to be applied to the dump body of the hauling machine.

2. The method of claim 1, wherein the operational state of hauling machine comprises one or more of a lift position of the dump body and a pressure applied to the dump body by an actuator of the hauling machine.

3. The method of claim 1, wherein the determining the failure condition further comprises one or more of comparing the first information to a threshold comparator and determining an irregularity in operation based on predetermined operational parameters.

4. The method of claim 1, wherein the failure condition further comprises one or more of a failed raising of the dump body and a failed lowering of the dump body.

5. The method of claim 1, wherein the causing the boost pressure to be applied to the dump body comprises increasing a lowering force applied to the dump body.

6. The method of claim 1, further comprising receiving second information relating to the operation of the dump body of the hauling machine in response to the applied boost pressure.

7. The method of claim 1, further including receiving location information relating to the dump site.

8. A system comprising:
   a sensor configured to sense first information relating to an operation of a dump body of a hauling machine, the hauling machine operating in at least a partially autonomous manner;
   a processor; and
   a memory bearing instructions that, upon execution by the processor, cause the system at least to:
     receive the first information;
     determine a failure condition of the operation based at least on the received first information;
     transmit a notification relating to the failure condition to a worksite controller; and
     cause a boost pressure to be applied to the dump body of the hauling machine, the applied boost pressure increasing a lowering force applied to the dump body.

9. The system of claim 8, wherein the first information comprises one or more of a lift position of the dump body and a pressure applied to the dump body by an actuator of the hauling machine.

10. The system of claim 8, wherein the determining the failure condition comprises one or more of comparing the first information to a threshold comparator and determining an irregularity in operation based on predetermined operational parameters.

11. The system of claim 8, wherein the failure condition comprises one or more of a failed raising of the dump body and a failed lowering of the dump body.

12. The system of claim 8, further including receiving additional information including location information relating to a dump site, and wherein the notification comprises an indication that the dump site is full.

13. The system of claim 8, further comprising receiving second information relating to the operation of the dump body of the hauling machine in response to the applied boost pressure.

14. A computer-implemented method comprising:
    sensing first information relating to an operation of a dump body of a machine, the first information including an operational state of the machine;
    receiving, by one or more processors, the first information;
    determining, by the one or more processors, a failure condition of the operation based at least on the received first information;
    generating a response signal based at least on the determined failure condition, wherein the response signal comprises one or more of a notification of the failure condition from the one or more processors to a worksite controller, and a remediation to the failure condition, wherein the notification comprises an indication that a dump site is full.

15. The method of claim 14, wherein the machine is operating in at least a partially autonomous manner.

16. The method of claim 14, wherein the machine is a hauling machine.

17. The method of claim 14, wherein the remediation to the failure condition comprises one or more of closing the dump site and autonomously causing a change in the operational state of the machine.

18. The computer-implemented method of claim 14, further including receiving information relating to a machine type, and receiving information relating to a location of the dump site.

19. The computer-implemented method of claim 14, further including receiving an instruction from the worksite controller to relocate the machine from the dump site.

20. The computer-implemented method of claim 14, wherein the operational state of the machine comprises one or more of a lift position of the dump body and a pressure applied to the dump body by an actuator of the machine.

\* \* \* \* \*